United States Patent
Zhang et al.

(10) Patent No.: US 12,079,300 B2
(45) Date of Patent: Sep. 3, 2024

(54) METHOD AND SYSTEM FOR ANALYZING DEBRIS BED FORMATION BASED ON MULTI-RESOLUTION MULTI-PHASE PARTICLE METHOD

(71) Applicant: Xi'an Jiaotong University, Xi'an (CN)

(72) Inventors: Bin Zhang, Xi+3 an (CN); Sheng Cao, Xi+3 an (CN); Wenpeng Wang, Xi+3 an (CN); Xiaoxing Liu, Zhuhai (CN); Minghao Hu, Xi+3 an (CN); Jianqiang Shan, Xi+3 an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 18/333,165

(22) Filed: Jun. 12, 2023

(65) Prior Publication Data
US 2023/0385367 A1 Nov. 30, 2023

(30) Foreign Application Priority Data
Jun. 13, 2022 (CN) .......................... 202210663358.7

(51) Int. Cl.
G06F 17/11 (2006.01)
(52) U.S. Cl.
CPC .................................. *G06F 17/11* (2013.01)
(58) Field of Classification Search
CPC ........... G06F 17/11; G06F 17/10; G06F 17/00
See application file for complete search history.

(56) References Cited

U.S. PATENT DOCUMENTS

| | | | |
|---|---|---|---|
| 2013/0096890 A1 | 4/2013 | Vanderheyden | |
| 2015/0186565 A1* | 7/2015 | Stomakhin | G06F 30/20 703/6 |
| 2016/0004802 A1* | 1/2016 | Herrmann | G06F 30/20 703/2 |
| 2017/0061048 A1* | 3/2017 | Grace | G06F 30/23 |

FOREIGN PATENT DOCUMENTS

| | | |
|---|---|---|
| CN | 109785909 A | 5/2019 |
| CN | 111832214 A | 10/2020 |

\* cited by examiner

*Primary Examiner* — Mohamed Charioui

(57) ABSTRACT

A method for analyzing debris bed formation based on a multi-resolution multiphase particle algorithm, which uses the least-squares moving particle semi-implicit method with second-order computational accuracy and improves surface tension model and free surface particle identification model. The method also utilizes a particle-based gas-liquid phase transition model and a particle-based liquid-solid phase transition model with multi-resolution features, such that the coolant vaporization and melt solidification processes during the falling process of the melt can be calculated. Moreover, a solid-solid collision model is coupled to calculate the collision and debris bed deformation during the falling process of the debris particles. In this way, the momentum exchange, energy transfer and phase transition between different phases are taken into account, and the computational instability caused by the large physical difference between phases is mitigated. A system for analyzing debris bed formation is further provided.

10 Claims, 10 Drawing Sheets

METHOD AND SYSTEM FOR ANALYZING DEBRIS BED FORMATION BASED ON MULTI-RESOLUTION MULTI-PHASE PARTICLE METHOD

CROSS-REFERENCE TO RELATED APPLICATIONS

This application claims the benefit of priority from Chinese Patent Application No. 202210663358.7, filed on Jun. 13, 2022. The content of the aforementioned application, including any intervening amendments thereto, is incorporated herein by reference in its entirety.

TECHNICAL FIELD

This application relates to the analysis of debris bed formation in nuclear reactors, and more particularly to a method and system for analyzing debris bed formation based on multi-resolution multiphase particle algorithm.

BACKGROUND

In nuclear reactor severe accidents, the molten corium, after falling down to the lower plenum of the reactor main vessel, comes into direct contact with the coolant, and will be solidified and fragmented, thus forming a debris bed. The formation process of the debris bed plays a decisive role in the shape of the debris bed, and is the prerequisite for the decay heat removal capacity analysis and the re-criticality analysis of the debris bed. So far, the studies on debris beds have mainly focused on the melt-coolant interaction, the cooled efficiency of the debris bed and the dynamic characteristics of the coolant pool, and less attention has been paid to the debris bed formation process. In general, the investigations on the debris bed formation are costly and time-consuming, and due to the constraints of experimental conditions, the dynamic capture of the debris bed formation is mostly done by indirect measurements instead of direct observations. The existing experimental conditions have not even approached to the real operating conditions inside the reactor at the time of the accident, and some mechanism models are needed for extrapolation.

The existing mechanism models are established mainly based on Eulerian or Lagrangian methods, and the Lagrangian method is predominant. In the Eulerian method, both fluids and solids are treated as a continuum, and the continuity equations are solved separately for individual phases based on the corresponding model. Unfortunately, regarding the Eulerian method, it is difficult to capture and track the phase interface, resulting in poor accuracy. In the Lagrangian method, liquids and gases are treated as a continuous fluid composed of particles, and solids consist of particle blocks with fixed relative positions, and the trajectories of fluid particles and solid particle blocks are solved according to their respective forces. Therefore, the Lagrangian method can accurately track the motion of each particle and achieve the accurate capturing and tracking of the phase interface. However, considering that a sufficiently stable gas-liquid phase transition model has only been proposed for the particle method in the past few years, and the large difference in physical properties of the solid and gas phases often causes great computation instability during the multiphase calculation, it has not been reported yet on the analysis and exploration of the debris bed formation process by using a solid-liquid-gas multi-phase calculation method. The existing numerical methods only consider the interaction between the coolant and the melt, and ignore the influence of collision between debris particles and the gas phase flow on the formation and distribution of the debris bed, and thus fail to accurately reflect the real situation of the debris bed formation. Therefore, the debris bed formation process cannot be accurately reproduced and monitored.

Thus, it is necessary to propose a suitable numerical analysis method to simulate the whole process of debris bed formation, so as to achieve the mechanistic study on the influencing factors and key phenomenon of the debris bed formation.

SUMMARY

In view of the deficiencies in the prior art, this application provides a method and a system for analyzing debris bed formation based on a multi-resolution multiphase particle algorithm, in which the characteristics of the debris bed formation process are involved, and the numerical analysis is performed on the debris bed formation in nuclear reactors based on gas-liquid-solid three-phase coupled calculation using the least squares moving particle semi-implicit method (LSMPS) with second-order accuracy combined with an improved surface tension model for multiple components, a free-surface particle identification model improved for multi-resolution, a multi-resolution gas-liquid phase transition model, a solid-liquid phase transition model and a solid-solid collision model.

Technical solutions of this application are described as follows.

In a first aspect, this application provides a method for analyzing debris bed formation based on a multi-resolution multiphase particle algorithm, including:

(S1) based on an initial working condition of debris bed formation in a nuclear reactor, performing geometry modeling to obtain a geometric distribution of particles;

(S2) performing a Link-list algorithm at each time step or several time steps to determine a position of each of the particles; and searching for neighboring particles within an effective radius of each particle's scope, and establishing link-list relationship for each particle;

(S3) according to the link-list relationship established in step (S2) and a Courant-Friedrichs-Lewy (CFL) condition, determining a time step size for a current calculation;

(S4) judging and identifying, based on an improved free-surface particle identification model, types of the particles in a computational domain, to identify an internal particle, a near-free surface particle, a free-surface particle, and an isolated particle in the computational domain;

(S5) solving explicitly a gravity and a viscous force for the internal particle, the near-free surface particle, the free-surface particle, and the isolated particle identified in step (S4); solving explicitly a surface tension for the free-surface particle; and summing accelerations caused by the gravity, the viscous force, and the surface tension to calculate a temporary particle acceleration;

(S6) according to the time step size determined in step (S3) and the temporary particle acceleration calculated in step (S5), calculating a temporary particle velocity and a temporary particle position;

(S7) according to the temporary particle position calculated in step (S6), solving an discretized energy conservation equation to update the particle enthalpy; determining whether a particle undergoes a phase transition based on a change of particle enthalpy; separating a gas particle from coolant particles undergoing a gas-liquid phase transition through a multi-resolution gas-liquid phase transition model; and correcting a phase state of molten particles that undergo a liquid-solid phase transition to become solidified through a liquid-solid phase transition model;

(S8) retrieving solidified particles to identify debris particles and debris beds; based on a solid-solid collision model, calculating collision among the debris particles and deformation of the debris beds; and in combination with the temporary particle velocity and the temporary particle position determined in step (S6), correcting velocities and positions of the particles;

(S9) based on corrected velocities and corrected positions obtained from step (S8), solving implicitly Pressure Poisson Equation (PPE) through a Biconjugate Gradient (BiCG) algorithm to update pressure of the particles; and (S10) calculating a pressure gradient term of all the particles using updated pressure obtained from step (S9); and substituting the pressure gradient term into a momentum conservation equation to update the velocities and positions of all the particles; and outputting a calculation result at a current timestep to generate real-time data of formation process, size, shape, and porosity of the debris bed for analysis of a debris bed formation process.

In an embodiment, step (S10) further comprises automatically generating a visual picture of the debris bed shape and debris distribution based on the obtained real-time data of the debris bed formation process, size, shape and porosity. In an embodiment, in step (S10), a dynamic cloud picture of different influencing factors is also automatically generated in combination with temperature, velocity, and pressure.

In an embodiment, in step (S4), a variable ifsur is introduced to characterize the types of the particles in the computational domain through a dual detection method based on geometric and algebraic calculations; the variable ifsur is defined as 0, 1, 2 or 3, respectively representing the internal particle, the near-free surface particle, the free-surface particle and the isolated particle;

among all quadrants of a particle i, if a proportion Ψ(i) of quadrants in which the particle i has no neighboring particles is greater than 0.2, the particle i is the free-surface particle; otherwise, the particle i is the internal particle; and if the number of neighboring particles $N_{sum}$<6 or a particle number density n'<0.6 $n_0$, the particle i is the isolated particle, wherein $n_0$ represents an initial particle number density.

In an embodiment, after the internal particle, the free-surface particle and the isolated particle are identified, the internal particle is subjected to secondary identification to identify the near-free surface particle from the internal particle according to the following criterion:

for the particle i: if there exists a particle j satisfying $ifsur_j=2$ and $ifsur_i=0$, a correction of $ifsur_i=1$ is gotten; and for the particle i: if there exists a particle j satisfying $ifsur_j=3$ and $ifsur_i=0$, a correction of $ifsur_i=1$ is gotten; wherein $ifsur_i$ represents the type of the particle i; and $ifsur_j$ represents the type of the particle j.

In an embodiment, step (S5) is performed through steps of:

(S501) calculating color function values $col_{i,m}$ of all the particles using a weight function ww;

(S502) according to the color function values, classifying all the particles into a type I and a type II, and calculating surface curvatures of the type-I and the type-II particles; and (S503) according to the surface curvatures of the type I and the type II obtained in step (S502), calculating a surface tension of a type-II particle; and repeating calculation until a contribution of all components to the surface tension of the type-II particle is obtained, to obtain a resultant force $\vec{f}_i^{sf}$ of surface tensions of each of the particles, and calculate the temporary particle acceleration $\vec{a}'$.

In an embodiment, the temporary particle acceleration $\vec{a}'$ is expressed as:

$$\vec{a}' = \vec{g} + \frac{1}{\rho}\nabla(\mu\nabla\cdot\vec{u}^n) + \frac{\vec{f}^{sf}}{\rho};$$

wherein $\vec{g}$ is gravitational acceleration; ρ is density; μ is dynamic viscosity; $\vec{u}^n$ represents a velocity at a previous time step; and $\vec{f}^{sf}$ represents a resultant force of surface tensions.

In an embodiment, in step (S7), the discretized energy conservation equation is solved to calculate enthalpies of the particles; according to an enthalpy change of a coolant particle, a vaporized mass and volume of the coolant particle are determined; and if a volume $vol_i^{n+1}$ of a coolant particle at a next time step is greater than a critical volume 1.4 $vol_{ini}$, it is determined that the coolant particle undergoes a gas-liquid phase transition; the corresponding coolant particle as a parent particle is split into a first sub-particle and a second sub-particle; a gas-phase fraction $vf_{par1}^{gw}$ and an enthalpy $h_{par1}^{n+1}$ of the first sub-particle are calculated; a gas-phase fraction $vf_{par2}^{gw}$ and an enthalpy $h_{par2}^{n+1}$ of the second sub-particle are calculated; and a volume fraction $vf_{par}^{m}$ of individual components in each of the first sub-particle and the second sub-particle is updated; and physical parameters of the first sub-particle and the second sub-particle are updated by volume weighting or mass weighting.

In an embodiment, according to an enthalpy change of a molten particle, the solid-phase fraction $\alpha_i^{sol}$ and the temperature $T_i$ of the molten particle i are calculated; when the solid-phase fraction $\alpha_i^{sol}$ is greater than 0.995, it indicates that the molten particle is completely solidified, and the phase state of the molten particle is corrected to solid phase; and the solid-phase fraction $\alpha_i^{sol}$ and the temperature $T_i$ are calculated as follows:

$$\begin{cases} \alpha_i^{sol} = 1 & h_i^{n+1} < h_{sol} \\ \alpha_i^{sol} = \dfrac{h_{liq} - h_i^{n+1}}{h_{sl}} & h_{sol} \leq h_i^{n+1} \leq h_{liq} \\ \alpha_i^{sol} = 0 & h_{liq} < h_i^{n+1} \end{cases}$$

$$\begin{cases} T_i = T_{mel} + \dfrac{h_i^{n+1} - h_{sol}}{\rho c} & h_i^{n+1} < h_{sol} \\ T_i = T_{mel} & h_{sol} \leq h_i^{n+1} \leq h_{liq} \\ T_i = T_{mel} + \dfrac{h_i^{n+1} - h_{liq}}{\rho c} & h_{liq} < h_i^{n+1} \end{cases};$$

wherein $h_{liq}$ represents the enthalpy at complete melting; $h_i^{n+1}$ represents the enthalpy of the particle i at the next time step; $h_{sl}$ represents latent heat of melting; $h_{sol}$ represents the enthalpy value at the onset of melting; $T_{mel}$ is melting temperature; $\rho$ is density; and c is specific heat capacity.

In an embodiment, in step (S8), solid particles in the computational domain are searched through Passively Moving Solid model to identify the debris particle and the debris bed in the computational domain; a mass, a velocity, and an angular velocity of each solid block are calculated; and a velocity and an angular velocity of a solid block after collision are calculated to correct the velocities and positions of all the particles, expressed as:

$$\begin{cases} m_{bi}\dfrac{d\vec{u}_{bi}}{dt} = \vec{F}_{bi} \\ I_{bi}\dfrac{d\vec{\omega}_{bi}}{dt} = \vec{T}_{bi} \end{cases};$$

wherein $m_{bi}$ is a mass of a solid block i; $\vec{u}_{bi}$ is a velocity of the solid block i; $I_{bi}$ is a rotational inertia of the solid block i; $\vec{\omega}_{bi}$ is an angular velocity of the solid block i; $\vec{F}_{bi}$ is a resultant force applied to the solid block i; and $\vec{T}_{bi}$ is a resultant moment applied to the solid block i.

In an embodiment, in step (S10), a velocity $\vec{u}^{n+1}$ and the position $\vec{r}^{n+1}$ of all the particles at the next time step are obtained by the pressure gradient term, expressed as:

$$\vec{u}^{n+1} = \vec{u}^{**} + \Delta t \cdot \left(-\dfrac{\nabla p}{\rho}\right) \vec{r}^{n+1} = \vec{r}^n + \Delta t \cdot \dfrac{\vec{u}^n + \vec{u}^{n+1}}{2};$$

$$\vec{r}^{n+1} = \vec{r}^n + \Delta t \cdot \dfrac{\vec{u}^n + \vec{u}^{n+1}}{2}$$

wherein $\vec{u}^{**}$ is the corrected velocity of a particle obtained in step (S8); $\Delta t$ is a time step size for the current calculation; $\nabla p$ is pressure gradient; $\rho$ is density; $\vec{u}^n$ is initial velocity at a current time step; and $\vec{r}^n$ is initial position at the current time step.

This application further provides a system for analyzing debris bed formation based on a multi-resolution multiphase particle algorithm, comprising:
 a geometry modeling module;
 a search module;
 a time-step determination module;
 an identification module;
 an acceleration module;
 a calculation module;
 a correction module;
 a calibration module;
 an update module; and
 an analysis module;
 the geometry modeling module is configured for performing particle geometry modeling to obtain a geometric distribution of particles based on initial working condition of debris bed formation;
 the search module is configured for executing a Link-list algorithm at each time step or several time steps to search for neighboring particles within the effective radius of each of the particles, and establishing the particle link-list relationship between particles;
 the time-step determination module is configured to determine a time step size for the current calculation through Courant-Friedrichs-Lewy (CFL) condition and the particle link-list relationship;
 the identification module is configured for judging and identifying, through an improved free-surface particle identification model, types of particles in the computational domain, to identify an internal particle, a near-free surface particle, a free-surface particle, and an isolated particle;
 the acceleration module is configured for solving explicitly the gravity and a viscous force acting on the internal particle, the near-free surface particle, the free-surface particle, and the isolated particle identified by the identification module, solving explicitly a surface tension acting on the free surface particle, and summing accelerations caused by the gravity, the viscous force, and the surface tension to calculate a temporary particle acceleration;
 the calculation module is configured for updating the temporary particle velocity and the temporary particle position according to the time step size determined by the time-step determination module and the temporary particle acceleration calculated through the acceleration module;
 the correction module is configured for solving a discretized energy conservation equation based on particles according to the temporary particle position calculated through the calculation module to update particle's enthalpy; determining whether a particle undergoes a phase transition based on the change of enthalpy; separating a gas particle, through a multi-resolution gas-liquid phase transition model, from coolant particles undergoing the gas-liquid phase transition; and correcting phase state of molten particles that undergo the liquid-solid phase transition to become solidified through the liquid-solid phase transition model;
 the calibration module is configured for retrieving the molten particles with the corrected phase state to identify debris particles and debris bed; based on a solid-solid collision model, calculating collision among the debris particles and deformation of the debris bed; and in combination with the temporary particle velocity and the temporary particle position determined through the calculation module, correcting velocities and positions of all the particles;
 the update module is configured for solving implicitly Pressure Poisson Equation (PPE) through the Biconjugate Gradient (BiCG) algorithm to update pressure of all the particles based on corrected velocities and corrected positions by the calibration module; and
 the analysis module is configured for calculating the pressure gradient of every particle using updated pressure obtained through the update module; and substituting the pressure gradient term into a momentum conservation equation to update the velocities and positions of all the particles; and outputting a calculation result of a current time step, to generate real-time data of formation process, size, shape, and porosity of the debris bed for analysis of the debris bed formation.

Compared to the prior art, this application has the following advantages.

In the method for analyzing debris bed formation based on a multi-resolution multiphase particle algorithm, through step (S1), the particle modeling is performed on the initial calculation condition of debris bed formation in a nuclear reactor, and the initial physical parameters are set. Through step (S4), the particle type is quickly and accurately identified. Through step (S7), it is simulated that when the core melt contacts with the coolant, the coolant is heated and vaporized to produce steam, and the melt is solidified and broken into debris. The collision between debris particles and the collision and deformation process caused by the debris particles falling to the debris bed are simulated by step (S8). The momentum exchange and energy transfer among the gas, liquid, and solid phases in the calculation domain are simulated by steps (S5) to (S10), to obtain the parameters of steam, coolant, melt and solid debris such as velocity, position and pressure at different moments, i.e., the whole process of melt forming the debris bed. The debris bed formation in a nuclear reactor is analyzed and studied mechanically through the above steps, taking the momentum exchange and energy transfer between gas, liquid and solid phases into account, and having realistic and complete elements of debris bed formation, which can achieve accurate and stable simulation of the development of the thermodynamic process of debris bed formation.

Further, by dividing the particles into four types, the discretization of the momentum conservation equation can be simplified accordingly for different types of particles, with only the gravity term considered for isolated particles and no surface tension term considered for internal particles, which improves the overall computational efficiency and achieves fast and accurate capture and trace of the phase interface. The near-free surface particles are differentiated from the internal particles, so that the control equations of the internal particles are discretized by the LSMPS method, and the control equations of other particles except the internal particles are discretized by the original MPS method, which can ensure the overall calculation accuracy and enhance the robustness of the numerical simulation. At the same time, the distinction between the free-surface particles and the near-free surface particles reduces the number of particle layers at the phase interface, which not only can obtain a more refined phase interface, but also increase the calculation accuracy of the surface tension model.

Further, by solving the explicit part of the momentum conservation equation and obtaining the temporary particle acceleration, the temporary particle velocity and temporary particle position can be calculated to provide the velocity and position for the subsequent gas-liquid phase transition, solid-liquid phase transition processing and solving the pressure Poisson equation.

Further, with the improved surface tension model presented in step (S5), the distribution profile of each material component in the particle field can be obtained to separate the particles near the phase interface from the internal particles. Moreover, the surface curvature of the phase interface can be calculated by the particles near the phase interface to find the magnitude and direction of the surface tension to which the particles are subjected, simplifying the calculation while ensuring the model's computational accuracy.

Further, using the multi-resolution gas-liquid phase transition model, the gas produced in the liquid coolant particles due to vaporization is separated out from the coolant particle as a separate gas particle in time, and the gas-liquid phase transition operation is realized while ensuring mass conservation. The multi-resolution phase transition model is used to generate small-size particle in the region where the flow field changes drastically and requires refined calculation, and to arrange large-size particle where the flow field changes slowly, as well as a smooth transition from small-size particle to large-size particle, realizing stable and accurate capture and operation of the gas-liquid phase transition process, and indirectly improving the robustness and calculation accuracy of the simulation.

Further, the solid phase fraction of the melt is calculated, the dynamic viscosity of the molten particles is corrected, and fully-solidified molten particles are promptly identified, and their phase state is corrected to ensure that the calculation is performed correctly.

Further, a cluster of solid phase particles close to each other is treated as a debris particle block, and the PMS model is used to detect and number all the debris particles and the debris bed, and treat them as a whole to perform collision calculations with the help of the solid-solid collision model, to simulate the real collision behavior occurring between the debris particles and between the debris particles and the debris bed during the formation of the debris bed.

Further, the coordinate transformation matrix is used to correct for the change in velocity and position of the solid particles due to the collision between the debris particles to which they belong and other debris particles.

This application improves the overall computational accuracy of the numerical simulation of the debris bed formation process and the identification accuracy of the free-surface particles, and achieves more refined phase interface tracking and positioning. This application has the advantages of perfect functionality, high computational accuracy, and good stability and scalability.

The technical solutions of the present disclosure are further described in detail below with reference to the accompanying drawings and embodiments.

DETAILED DESCRIPTION OF EMBODIMENTS

Figure 1:
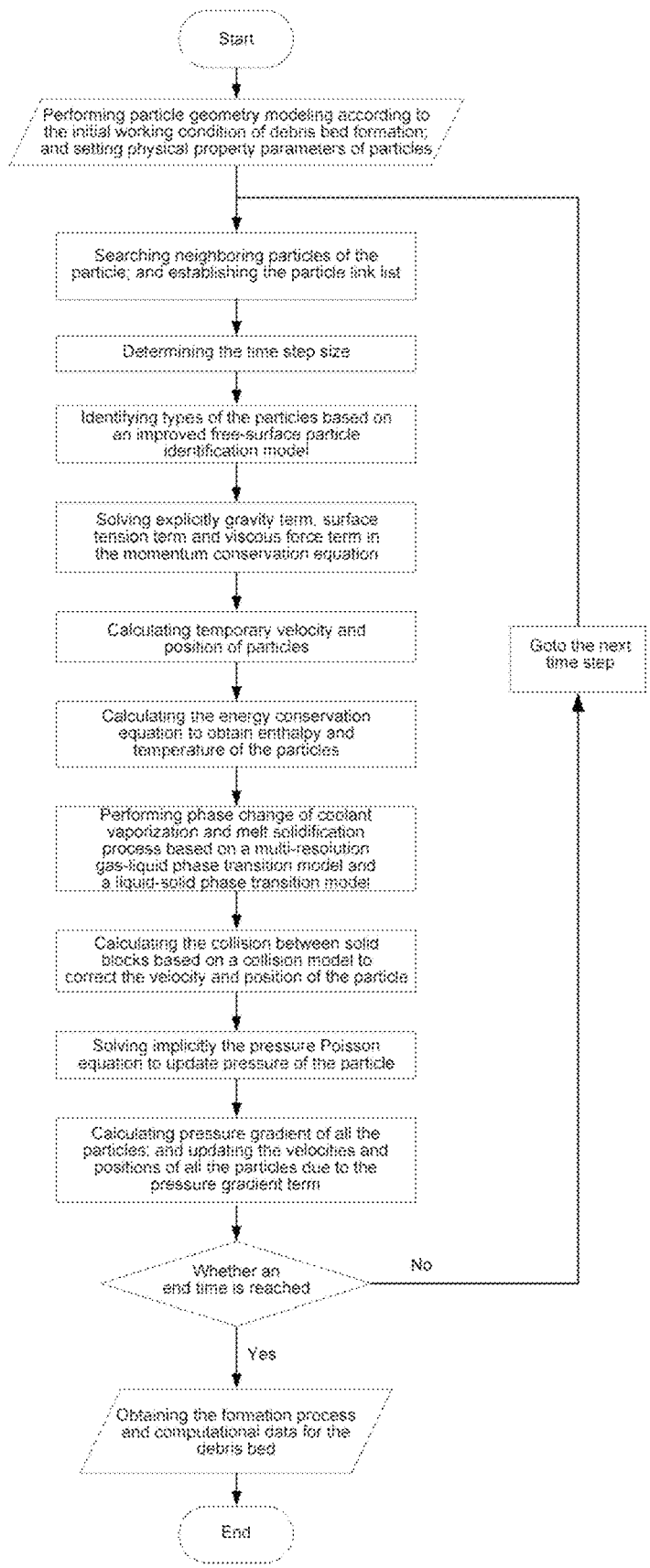
FIG. 1 is a flow chart of a debris bed formation analysis method according to one embodiment of the present disclosure.

The technical solutions in the embodiments of the present disclosure will be clearly and completely described below in conjunction with the accompanying drawings of the present disclosure. It is clear that described below are merely some embodiments of the disclosure, which are not intended to limit the disclosure. For those skilled in the art, other embodiments obtained based on these embodiments without paying creative efforts should fall within the scope of the disclosure.

It should be understood that as used herein, the terms "include" and "comprise" indicate the presence of the described features, entireties, steps, operations, elements and/or components, but do not exclude the presence or addition of one or more other features, entireties, steps, operations, elements, components and/or a combination thereof.

It should be understood that the terms used in the disclosure are used solely for describing specific embodiments and not intended to limit the disclosure. As used herein, unless otherwise expressly specified and defined, the singular forms "one", "a" and "the" are intended to include the plural forms.

As used herein, the term "and/or" refers to any and all possible combinations of one or more of the items listed, and includes those combinations. For example, A and/or B may denote: A, a combination of A and B, and B. In addition, the character "/" in the disclosure generally indicates an "or" relationship between the former and later associated objects.

It should be understood that although the terms "first", "second", and "third" may be used to describe a predetermined range, the predetermined range should not be limited to these terms. These terms are used only to distinguish the predetermined ranges from each other. For example, a first predetermined range without departing from the spirit of the disclosure may also be referred to as a second predetermined range, and similarly, a second predetermined range may also be referred to as a first predetermined range.

Depending on the context, the word "if" as used herein may be interpreted as "at . . . " or "when . . . " or "in response to a determination" or "in response to a detection". Similarly, depending on the context, the phrase "if determined" or "if detected (the stated condition or event)" may be interpreted as "when determined" or "in response to a determination" or "when detecting (the stated condition or event)" or "in response to a detection (the stated condition or event)".

Various structural schematics are shown in the accompanying drawings according to embodiments of the present disclosure. These drawings are not to scale, wherein certain details have been enlarged and may have been omitted for clarity. The shapes of the various regions and layers shown in the drawings and the relative size and position relationships between them are only exemplary and may deviate due to manufacturing tolerances or technical limitations in practice. The person skilled in the art may additionally design regions/layers with different shapes, sizes, and relative positions depending on actual demand.

The disclosure provides a method for analyzing debris bed formation based on a multi-resolution multiphase particle algorithm, using a least-squares moving particle semi-implicit method with second-order computational accuracy, and further improving the surface tension model and free-surface particle identification model to improve the stability and accuracy of particle calculation. Meanwhile, the method also uses a particle-based gas-liquid phase transition model and a particle-based liquid-solid phase transition model with multi-resolution features, such that the coolant vaporization and melt solidification processes during the fall of the melt can be calculated. In this way, the momentum-energy transfer and phase transition between different phases are taken into account, but also the computational instability caused by the large physical difference between phases is mitigated. Moreover, a coupled solid-solid collision model is introduced to calculate the collision and debris bed deformation during the falling process of debris particles, and the force interaction between different materials and phases is taken into account, and a method for analyzing debris bed formation with multi-phase coupling and multi-resolution characteristics is finally developed.

Referring to FIG. 1, a method for analyzing debris bed formation based on a multi-resolution multiphase particle algorithm includes the following steps.

(S1) For an initial working condition of debris bed formation in a nuclear reactor, a particle-based geometry modeling is established. The thermal and mechanical parameters of particles are set, including velocity, temperature, pressure, phase state, component fraction, density, thermal conductivity, specific heat capacity, dynamic viscosity, and surface tension coefficient. At the same time, initial parameters for calculation are set, including particle effective radius, particle initial volume, initial time step size, and particle number density.

(S2) A Link-list algorithm is performed at each time step or several time steps. Position of each of the particles obtained from step (S1) or after finishing calculation of a previous time step are retrieved. Neighboring particles within the effective radius of each particle's scope are identified, and a corresponding particle link-list relationship is established.

(S3) According to the particle link-list relationship established in step (S2), a time-step size stability through a Courant-Friedrichs-Lewy condition (CFL) condition is judged to determine a time step size for a current calculation.

(S4) Through an improved free-surface particle identification model, types of particles in a computational domain are judged and identified to distinguish internal particles, near-free surface particles, free-surface particles, and isolated particles in the computational domain.

In order to distinguish surface particles more quickly and accurately in the multi-resolution calculation, a variable ifsur is introduced to characterize the types of the particles in the computational domain through a dual detection method based on geometric and algebraic calculations. The variable ifsur is defined as 0, 1, 2, or 3, respectively representing the internal particle, the near-free surface particle, the free-surface particle, and the isolated particle.

A geometric detection is first performed, $N_0$ quadrants are generated by taking the particle to be judged as the origin, and projection angles $\theta_{ij}$ of all neighboring particles within the particle and the quadrants $N_j$ to which they belong are calculated by the following formulas:

$$\theta_j = \left(\frac{180}{\pi}\right) \tan^{-1}\left(\frac{r_\beta}{r_\alpha}\right); \quad (1)$$

and $$N_j = \left[\frac{\theta_j}{\theta_0}\right] + 1; \quad (2)$$

where $\theta_0$ is an angular dimension contained in each quadrant.

$\Gamma(i)$ represents the number of quadrants in which a particle i has neighboring particles, so a proportion $\Psi(i)$ of quadrants in which the particle i has no neighboring particles is calculated by the following formula:

$$\Psi(i) = 1 - \frac{\Gamma(i)}{N_0}. \quad (3)$$

When the proportion $\Psi(i)$ of quadrants in which the particle i has no neighboring particles is greater than 0.2, the particle i is initially determined as the free-surface particle; otherwise, the particle i is determined as the internal particle.

After completing the geometric detection, algebraic detection is performed on the particles.

The number of neighboring particles $N_{sum}$ and the particle number density n' satisfy the following formula:

$$n' = \sum_j w_{ij}. \quad (4)$$

When the number of neighboring particles $N_{sum} < 6$ or the particle number density $n' < 0.6\ n_0$, the particle i is judged as the isolated particle.

After the internal particle, the free-surface particle and the isolated particle are identified, the internal particle near the free surface is subjected to secondary identification to identify the near-free surface particle from the internal particle according to the following criterion:

for the particle i: if there exists a particle j satisfying ifsur$_j$=2 and ifsur$_i$=0, a correction of ifsur$_i$=1 is gotten; and for the particle i: if there exists a particle j satisfying ifsur$_j$=3 and ifsur$_i$=0, a correction of ifsur$_i$=1 is gotten; where ifsur$_i$ represents the type of the particle i; and ifsur$_j$ represents the type of the particle j.

(S5) Based on the internal particles, the near-free surface particles, the free-surface particles, and the isolated particles identified in step (S4), a gravity and a viscous force are solved. A surface tension for the free-surface particle is explicitly solved. The accelerations caused by the gravity, the viscous force, and the surface tension are summed to calculate a temporary particle acceleration.

The temporary particle acceleration $\vec{a}'$ is expressed as:

$$\vec{a}' = \vec{g} + \frac{1}{\rho}\nabla(\mu\nabla\cdot\vec{u}^n) + \frac{\vec{f}^{sf}}{\rho};$$

where $\vec{g}$ is gravitational acceleration; $\rho$ is density; $\mu$ is dynamic viscosity; $\vec{u}^n$ represents a velocity at a previous time step; and $\vec{f}^{sf}$ represents a resultant force of the surface tension.

For the calculation of the surface tension $\vec{f}^{sf}$, the surface tension model is improved for the multiphase and multi-resolution characteristics of this method.

Specifically, a function $vf_{i,m}$ represents the volume fraction of component m in the particle i. The calculation of the contribution of the component m to the surface tension of the particle i is taken as an example to illustrate the calculation steps of the improved surface tension model.

The step (S5) is performed through the following steps.

(S501) A weight function ww is used to calculate color function values $col_{i,m}$ of all the particles, and the calculation formula is expressed as:

$$col_{i,m} = \frac{\sum_{i\in j}(ww_{ij}\cdot vf_{i,m})}{\sum_{i\in j}ww_{ij}}. \quad (5)$$

In the above formula, the weight function ww is an improved cubic spline kernel function for the multi-resolution particle calculation.

(S502) According to the color function values, all the particles are classified into the type I and the type II, and surface curvatures of the type-I and the type-II particles are calculated.

$0.2 < col_{i,m} < 0.8$ is set as the type-I particles, and $col_{i,m} \leq 0.2$ or $col_{i,m} \geq 0.8$ is set as the type-II particles.

For the type-I particles, a phase interface normal vector is first calculated by the following formula:

$$Norm_{i,m} = -\frac{\nabla col_{i,m}}{|\nabla col_{i,m}|}. \quad (6)$$

Then, a surface curvature of the component m is calculated by the following formula:

$$cur_{i,m} = \nabla \cdot Norm_{i,m} \quad (7).$$

Then, a surface tension of the type-I particle due to the component m is calculated by the following formula:

$$\vec{f}_{i,m}^{sf} = \sigma_i \cdot cur_{i,m} \cdot (\nabla col_{i,m}) \quad (8).$$

In above formula, $\sigma_i$ is the surface tension conversion coefficient of the particle i.

(S503) A surface tension of the type-II particle is calculated.

First, based on the type-I particle, a curvature $cur_{i,m}$ of the component m in the type-II particles is calculated by the following formula:

$$cur_{i,m} = \frac{\sum_{j\in A}(ww_{ij}\cdot cur_{j,m})}{\sum_{j\in A}ww_{ij}}. \quad (9)$$

Then, the surface tension of the type-II particle due to the m component is calculated by the following formula:

$$\vec{f}_{i,m}^{sf} = \sigma_i \cdot cur_{i,m} \cdot (\nabla col_{i,m}) \quad (10).$$

Steps (S501)~(S503) are repeated until the contribution of all components to the surface tension of the particles is calculated, and the resultant surface tension of the surface tension of each of the particles is obtained by the following formula:

$$\vec{f}_i^{sf} = \sum_{m=1}^n \vec{f}_{i,m}^{sf} \quad (11).$$

The resultant forces of gravity, viscous force and surface tension are obtained through step (S5), respectively. The temporary particle acceleration is calculated by the following formula:

$$\vec{a}' = \vec{g} + \frac{1}{\rho}\nabla(\mu\nabla\cdot\vec{u}^n) + \frac{\vec{f}^{sf}}{\rho}. \quad (12)$$

(S6) According to the time step size determined in step (S3) and the temporary particle acceleration calculated in step (S5), the temporary particle velocity $\vec{u}*$ and the temporary particle position $\vec{r}*$ are calculated by the following formulas:

$$\vec{u}* = \vec{u}^n + \vec{a}' \cdot \Delta t$$

$$\vec{r} = \vec{r}^n + \vec{u}* \cdot \Delta t \quad (13)$$

where $\vec{u}^n$ is the velocity of the particles after the last time step is completed; rn is the position of the particles after the last time step is completed; and $\Delta t$ is the time step of this calculation.

(S7) According to the temporary particle position calculated in step (S6), the discretized energy conservation equation is solved to calculate the particle enthalpy. By analyzing the change in particle enthalpy, it is determined whether a particle undergoes a phase transition. Through the multi-resolution gas-liquid phase transition model, a gas particle is separated from coolant particle undergoing a gas-liquid phase transition. A phase state of molten particles that undergo a liquid-solid phase transition to become solidified is corrected through the liquid-solid phase transition model, so as to realize accurate simulation of coolant vaporization and melt solidification during the fall of the core melt.

Specifically, during initial modeling, the volumes of the coolant particles and the melt particles are set to 0.7 $vol_{ini}$ and $vol_{ini}$, respectively, and $vol_{ini}$ is the initial volume of the particles.

The particle enthalpy change is calculated according to the energy conservation equation as follows:

$$\rho_j \frac{h_i^{n+1} - h_i^n}{\Delta t} = k_i' \cdot \nabla^2 T + \Phi_{rad}; \quad (14)$$

where $\rho_i$ is density of the particle i, kg/m³; $c_p$ is constant pressure specific heat capacity of the particle i, J/(kg·K); $h_i^n$ is an enthalpy of the particle i at this time step, J/kg; $h_i^{n+1}$ is an enthalpy of the particle i at the next time step, J/kg; $\Delta t$ is the time step, s; $k_i'$ is an equivalent thermal conductivity of the particle i, W/(m·K); and $\Phi_{rad}$ is other source term of the particle due to radiative heat exchange, nuclide decay heat, etc., W.

The mass and volume of the coolant particles vaporized in this time step are calculated from the change in the particle enthalpy, and the calculation formulas are expressed as:

$$\Delta m_g = \frac{h_i^{n+1} - h_i^n}{h_{lg}} vol_i^n; \quad (15)$$

and $$vol_i^{n+1} = vol_i^n + \Delta m_g \left( \frac{1}{\rho_g} - \frac{1}{\rho_l} \right). \quad (16)$$

In the above formulas, $h_{lg}$ is a latent heat of the coolant vaporization, J/kg; $\rho_g$ is a gas phase density of the coolant, kg/m³; and $\rho_l$ is a liquid phase density of the coolant, kg/m³.

If the volume $vol_i^{n+1}$ of the coolant particle at the next moment is greater than the critical volume 1.4 $vol_{ini}$, it is determined that the coolant particle undergoes a gas-liquid phase transition. The corresponding particle as the parent particle is split into a first sub-particle and a second sub-particle. The volumes $vol_{par1}$ and $vol_{par2}$, the positions $\vec{r}_{par1}^{n+1}$ and $\vec{r}_{par2}^{n+1}$, and the velocities $\vec{u}_{par}^{n+1}$ of the first sub-particle and the second sub-particle are calculated by the following formulas:

$$\begin{cases} vol_{par1} = vol_{par2} = 0.5 vol_j^{n+1} \\ \vec{r}_{par1}^{n+1} = \vec{r}_i^{n+1} + 0.5\sqrt{vol_j^{n+1}} \vec{n} \\ \vec{r}_{par2}^{n+1} = \vec{r}_i^{n+1} - 0.5\sqrt{vol_i^{n+1}} \vec{n} \\ \vec{u}_{par}^{n+1} = \begin{bmatrix} u_{par}^{n+1} \\ v_{par}^{n+1} \end{bmatrix} = \begin{bmatrix} u_i^n \\ v_i^n \end{bmatrix} + \begin{bmatrix} \frac{\partial u}{\partial \alpha} & \frac{\partial u}{\partial \beta} \\ \frac{\partial v}{\partial \alpha} & \frac{\partial v}{\partial \beta} \end{bmatrix} \begin{bmatrix} r_{par,\alpha} - r_{i,\alpha} \\ r_{par,\beta} - r_{i,\beta} \end{bmatrix} \end{cases} \quad (17)$$

In the above formulas, $\vec{n}$ is a direction of a normal phase at the gas-liquid phase interface.

A gas-phase fraction $vf_{par1}^{gw}$ and an enthalpy $h_{par1}^{n+1}$ of the first sub-particle are calculated. A gas-phase fraction $vf_{par2}^{gw}$ and an enthalpy $h_{par2}^{n+1}$ of the second sub-particle are calculated. A volume fraction $vf_{par}^m$ ar of individual components in each of the first sub-particle and the second sub-particle are updated.

The physical parameters of the first sub-particle and the second sub-particle are updated by volume weighting or mass weighting. Any of the physical parameters is expressed as:

$$\Phi_{par}^{n+1} = \sum_{m=1}^{n} (vf_{par}^m \cdot \Phi_m). \quad (18)$$

Similarly, after updating the enthalpies of the particles, it is determined whether the molten particles undergo a solidification phase transition. The enthalpy of the molten particle is calculated by the following formula:

$$h_i^{n+1} = h_i^n + \frac{\Delta t}{\rho_i}(k_i' \nabla^2 T + \Phi_{rad}). \quad (19)$$

In the above formula, k' is an equivalent thermal conductivity of two particles at multiple-resolutions calculation. For the particle i and the particle j, when both the particle i and the particle j transfer energy through thermal conductivity, the equivalent thermal conductivity is calculated as follows:

$$k_i' = k_j' = \frac{\sqrt{vol_i/vol_{ini}} \cdot k_i + \sqrt{vol_i/vol_{ini}} \cdot k_j}{\sqrt{vol_i/vol_{ini}} + \sqrt{vol_i/vol_{ini}}}. \quad (20)$$

The solid-phase fraction $\alpha_i^{sol}$ and temperature $T_i$ of each molten particle are calculated as follows:

$$\begin{cases} \alpha_i^{sol} = 1 & h_i^{n+1} < h_{sol} \\ \alpha_i^{sol} = \frac{h_{liq} - h_i^{n+1}}{h_{sl}} & h_{sol} \leq h_i^{n+1} \leq h_{liq} \\ \alpha_i^{sol} = 0 & h_{liq} < h_i^{n+1} \end{cases} \quad (21)$$

and $$\begin{cases} T_i = T_{mel} + \frac{h_i^{n+1} - h_{sol}}{\rho c} & h_i^{n+1} < h_{sol} \\ T_i = T_{mel} & h_{sol} \leq h_i^{n+1} \leq h_{liq} \\ T_i = T_{mel} + \frac{h_i^{n+1} - h_{liq}}{\rho c} & h_{liq} < h_i^{n+1} \end{cases} \quad (22)$$

In the above formulas, $h_{sol}$ represents the enthalpy at the onset of melting, J/kg; $h_{liq}$ represents an enthalpy at complete melting, J/kg; $h_{sl}$ is a latent heat of melting, J/kg; and $T_{mel}$ is the melting temperature K.

When the solid-phase fraction $\alpha_i^{sol}$ of the molten particle is greater than 0.995, the molten particle is completely solidified, and a phase of the molten particle is corrected to the solid phase.

Through the step (S7), the heat exchange between the core melt and the coolant after contact is derived to simulate the phenomenon of heat vaporization of the coolant and solidification of the liquid melt in the coolant to form debris particles.

(S8) The molten particles with the phase state corrected in step (S7) are retrieved to identify the debris particles and the debris bed. Based on the solid-solid collision model, the collision among the debris particles and collision and deformation of the debris bed are calculated. In combination with the temporary particle velocity and the temporary particle position determined in step (S6), velocities and positions of all the particles are corrected.

Specifically, the PMS model is first used to retrieve and identify the debris particles and the debris bed in the computational domain, and the mass, velocity, and angular velocity of each solid block are calculated as follows:

$$\begin{cases} m_{bi} = \sum_{j \in bi} m_j \\ I_{bi} = \sum_{j \in bi} m_j (\vec{r}_j - \vec{r}_{bi})^2 \\ \vec{u}_{bi} = \frac{1}{m_{bi}} \sum_{j \in bi} \vec{u}_j \cdot m_j \\ \vec{\omega}_{bi} = \frac{1}{I_{bi}} \sum_{j \in bi} m_j (\vec{r}_j - \vec{r}_{bi}) \otimes \vec{u}_j \end{cases} \quad (23)$$

In the above formulas, $m_{bi}$ is a mass of a solid block i; $m_j$ is a mass of the particle j; $I_{bi}$ is a rotational inertia of the solid block i; $\vec{r}_j$ is a position vector of the particle j; $\vec{r}_{bi}$ is a position vector of a center of mass of the solid block i; $\vec{u}_{bi}$ is a velocity of the solid block i, m/s; $\vec{u}_j$ is a velocity of the particle j, m/s; and $\vec{\omega}_{bi}$ is an angular velocity of the solid block i, rad/s.

Figure 2:
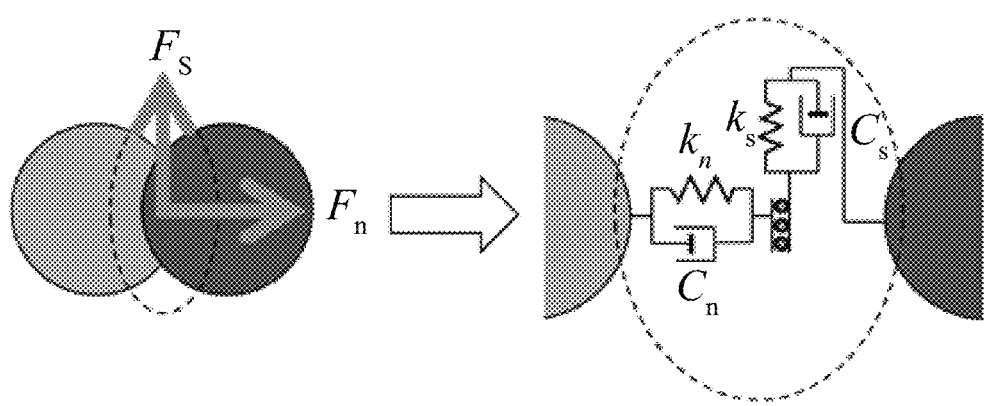
FIG. 2 is a schematic diagram of a solid block collision model according to one embodiment of the present disclosure.

Then, the velocity and angular velocity of the solid block after the collision are calculated by the following formula:

$$\begin{cases} m_{bi} \frac{d\vec{u}_{bi}}{dt} = \vec{F}_{bi} \\ I_{bi} \frac{d\vec{\omega}_{bi}}{dt} = \vec{T}_{bi} \end{cases} \quad (24)$$

where $\vec{F}_{bi}$ is a resultant force applied on the solid block i; and $\vec{T}_{bi}$ is a resultant moment applied on the solid block i. The collision between any two solid blocks i and j are solved by the following formula:

$$\begin{cases} \vec{F}_{bi,bj} = \vec{F}^n_{bi,bj} + \vec{F}^s_{bi,bj} \\ \vec{T}_{bi,bj} = R_{bi} \otimes \vec{F}^s_{bi,bj} - T^r_{bi,bj} \end{cases} \quad (25)$$

where $\vec{T}_{bi,bj}^r$ is a rolling friction moment between the solid blocks i and j due to elastic hysteresis loss and viscous dissipation; $R_{bi}$ is an equivalent radius of the solid block i; $\vec{F}_{bi,bj}^n$ and $\vec{F}_{bi,bj}^s$ are a normal phase and a tangential contact force between the solid blocks i and j, respectively; and a linear spring-damping model is calculated as follows:

$$\begin{cases} \vec{F}^n_{bi,bj} = -k_n \delta_n + c_n \frac{d\delta_n}{dt} \\ \vec{F}^s_{bi,bj} = \min\left\{ \left| k_s \delta_s + c_s \frac{d\delta_s}{dt} \right|, \mu F_n \right\} \cdot \text{sign}\left( k_s \delta_s + c_s \frac{d\delta_s}{dt} \right) \end{cases} \quad (26)$$

where $F_n$ is a contact force between the solid block i and the solid block j; $\delta$ is a relative displacement at the contact point between the solid block i and the solid block j; and k, c, and μ is the stiffness, damping coefficient, and friction coefficient, respectively. FIG. 2 is a schematic diagram of the adopted solid block collision model.

After calculating the velocity $\vec{u}_{bi}$ and the angular velocity $\vec{\omega}_{bi}$ of the solid block, the velocity $\vec{u}_i^{}$ and the position $\vec{r}_i^{}$ of the particle are corrected by the following formula:

$$\begin{cases} \vec{r}^*_{bi} = \vec{r}^n_{bi} + \vec{u}_{bi} \cdot \Delta t \\ \vec{r}^{**}_i = \vec{r}^*_i + M(\vec{r}^*_i - \vec{r}^*_{bi}) \\ \vec{u}^{}_i = \frac{(\vec{r}^{}_i - \vec{r}^n_i)}{\Delta t} \end{cases} \quad (27)$$

where $\Delta t$ is the time step size; $\vec{r}_{bi}^n$ and $\vec{r}_{bi}^*$ are positions of the center of mass of the solid block i before and after the collision; $\vec{r}_i^n$ is the initial position of the particle i at this time step; and M is a coordinate transformation matrix.

(S9) Based on corrected velocities and corrected positions obtained from step (S8), the Pressure Poisson Equation is solved implicitly through a Biconjugate Gradient (BiCG) algorithm to update pressure of all the particles.

(S10) A pressure gradient of all the particles is calculated by using updated pressure obtained from step (S9). The pressure gradient is substituted into the pressure gradient term of a momentum conservation equation to update the velocities and positions of all the particle. The calculation result of a current time step is output, thereby generating real-time data of formation process, size, shape, and porosity of the debris bed for analysis of the debris bed formation.

In some embodiments, step (S10) further includes the steps of automatically generating a visualization picture of the debris bed shape and debris distribution based on the obtained real-time data of the debris bed formation process, size, shape, and porosity. In some embodiments, in step (S10), a dynamic cloud map of different influencing factors is also automatically generated in combination with temperature, velocity, pressure, etc.

The debris bed formation analysis method in the disclosure constructs a gas-liquid-solid three-phase coupled computational model and a multi-resolution phase transition model to calculate the forces and energy transfer among the debris particles, coolant and gas. In addition, the disclosure also precisely locates the phase interface by the motion of particles, so as to more accurately analyze and study the debris bed formation process. The disclosure also employs a least-squares moving particle method with computer simulations to reproduce the entire process of debris bed formation, and real-time monitoring of the position of debris particles, temperature distribution, and the shape of debris bed accumulation at each moment.

Thus, the method can automatically locate the phase interface and automatically generate a dynamic map of the phase interface over time, without additional interface reconstruction calculations. The dynamic prediction of the accident process considering the interaction between the debris particles, gas and coolant generates a visual picture of the debris bed shape and debris distribution, and can automatically generate dynamic cloud maps of different influencing factors in combination with temperature, velocity, pressure, etc.

In another aspect, the disclosure further provides a system for analyzing debris bed formation based on a multi-resolution multiphase particle algorithm, which can be used to implement the method for analyzing the debris bed formation based on the multi-resolution multiphase particle algorithm described above. The system for analyzing debris bed formation includes a geometry modeling module, a search module, a time-step determination module, an identification module, an acceleration module, a calculation module, a correction module, a calibration module, an update module, and an analysis module.

The geometry modeling module is configured for performing geometry modeling to obtain the distribution of particles based on an initial working condition of debris bed formation in a nuclear reactor.

The search module is configured for executing a Link-list algorithm at each time step or several time steps to determine a position of each of the particles, searching for neighboring particles within the effective radius of each particle's scope, and establishing link-list relationship for each particle.

The time-step determination module is configured to determine a time step size for a current calculation according to Courant-Friedrichs-Lewy (CFL) condition and the link-list relationship.

The identification module is configured for judging and identifying, through an improved free-surface particle identification model, types of the particles in a computational domain, to identify an internal particle, a near-free surface particle, a free-surface particle, and an isolated particle in the computational domain.

The acceleration module is configured for solving explicitly a gravity and a viscous force for the internal particle, the near-free surface particle, the free-surface particle, and the isolated particle identified by the identification module, solving explicitly a surface tension for the free surface particle, and summing accelerations caused by the gravity, the viscous force, and the surface tension to calculate a temporary particle acceleration.

The calculation module is configured for calculating a temporary particle velocity and a temporary particle position according to the time step size determined by the time-step determination module and the temporary particle acceleration calculated through the acceleration module.

The correction module is configured for solving a discretized energy conservation equation according to the temporary particle position calculated through the calculation module to calculate a particle enthalpy; determining whether a particle undergoes a phase transition based on a change of the particle enthalpy; separating a gas particle, through the multi-resolution gas-liquid phase transition model, from coolant particles undergoing a gas-liquid phase transition; and correcting a phase state of molten particles that undergo a liquid-solid phase transition to become solidified through the liquid-solid phase transition model.

The calibration module is configured for retrieving solidified particles to identify debris particles and debris bed; based on the solid-solid collision model, calculating collision among the debris particles and deformation of the debris bed; and in combination with the temporary particle velocity and the temporary particle position determined through the calculation module, correcting velocities and positions of all the particles.

The update module is configured for solving implicitly Pressure Poisson Equation through the Biconjugate Gradient (BiCG) algorithm to update pressure of all the particles based on corrected velocities and corrected positions by the calibration module.

The analysis module is configured for calculating a pressure gradient term of all the particles using updated pressure obtained through the update module; and substituting the pressure gradient term into a momentum conservation equation to update the velocities and positions of all the particles; and outputting a calculation result at a current time step, to generate real-time data of formation process, size, shape, and porosity of the debris bed for analysis of the debris bed formation process.

In order to validate the stability and accuracy of the developed debris bed formation analysis method based on the multi-resolution multiphase particle and the system, numerical simulations are employed to verify the fragmentation process of the molten jets in the coolant.

Figure 3:
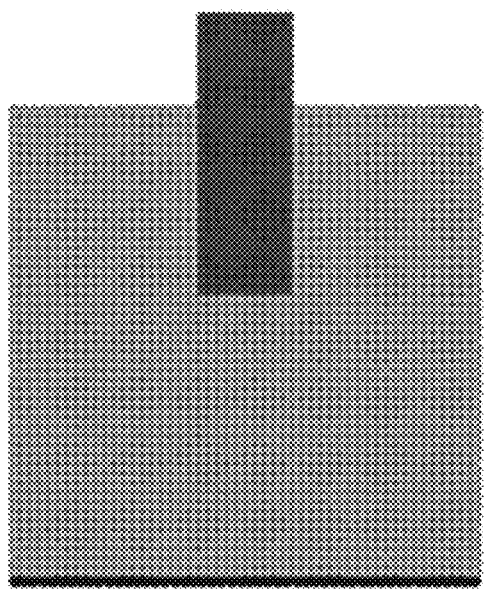
FIG. 3 is a model diagram of a debris bed formation according to one embodiment of the present disclosure.
Figure 4A:
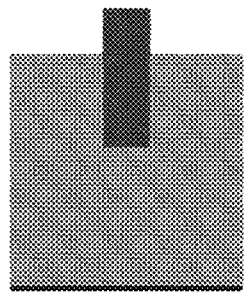
FIGS. 4(a)-(f) show real-time dynamic diagram of debris position distribution, debris formation process, and debris settling distribution, where (a) is 0.0 s; (b) is 1.0 s; (c) is 2.0 s; (d) is 3.0 s; (e) is 4.0 s; and (f) is 5.0 s.
Figure 4B:
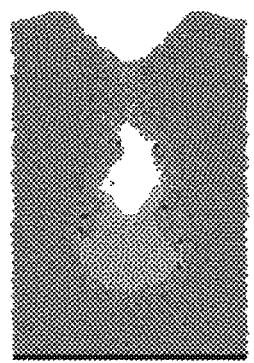
Figure 4C:
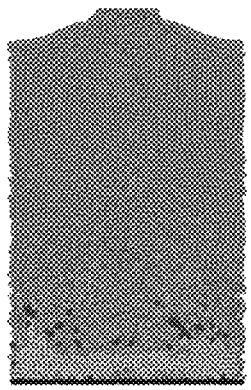
Figure 4D:
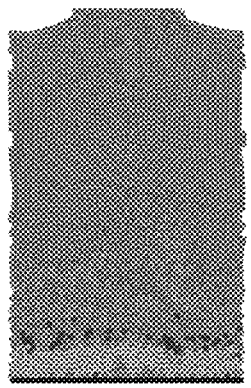
Figure 4E:
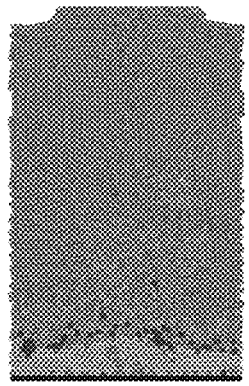
Figure 4F:
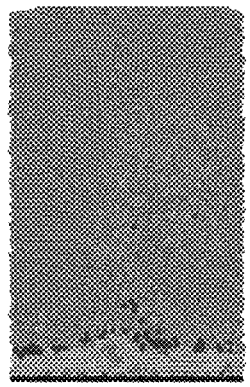

FIG. 3 shows the initial particle arrangement of the debris bed formation calculation with an initial particle spacing of $5.0 \times 10^{-4}$ m. The bottom of the melt at the initial moment is in contact with the upper surface of the coolant. The coolant pool adopts a particle arrangement of 220×300. The melt has a particle arrangement of 12×100. The dimension of the corresponding coolant pool is 0.11 m×0.15 m, and the dimension of the melt is 0.006 m×0.05 m. The initial temperature of the melt is set to 2000 K, and the initial temperature of the coolant is set to 600 K. It is assumed that the boiling point of the coolant is 605 K. The initial velocity of the melt is set to 0 m/s, the coolant pool is initially in a calm state, and the initial jet diameter of the melt is 12 mm.

TABLE 1

Physical properties of melt and coolant

| Parameter | Melt | Coolant |
|---|---|---|
| Melting and boiling point/K | 1700.0 | 510 |
| Latent heat of phase transition/J · kg$^{-1}$ | 269.55 × 10$^3$ | 1680.0 × 10$^3$ |
| Density/kg · m$^{-3}$ | 7930 | 1000.0 |
| Specific heat/J · (kg · K)$^{-1}$ | 500 | 4350 |
| Thermal conductivity/W · (m · K)$^{-1}$ | 16.0 | 1.0 |
| Kinetic viscosity/Pa · s | 5.88 × 10$^{-3}$ | 1.0 × 10$^{-3}$ |

Figure 5:
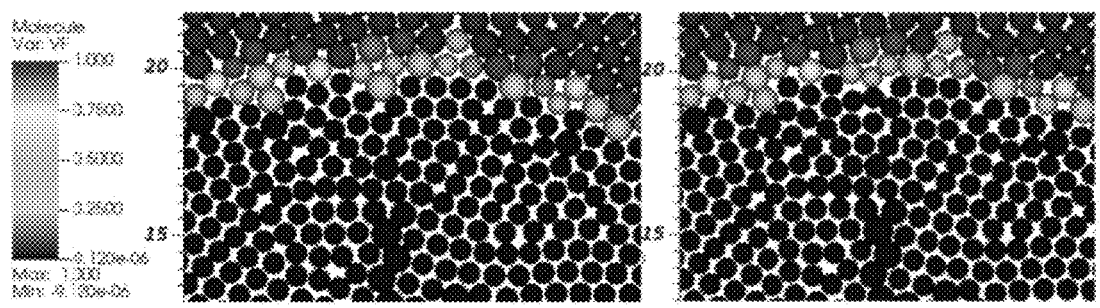
FIG. 5 shows a phase transition process of a coolant.

The calculation time of the simulation is 0.50 s. The calculation results include the position distribution, temperature distribution, fragmentation process of the melt at different moments, and the coolant phase transition process in the local calculation domain. The phase state of the melt was traced during the calculation. FIGS. 4(a)-(f) show the position distribution of the melt and coolant at 0.0 s, 1.0 s, 2.0 s, 3.0 s, 4.0 s, and 5.0 s. The fragmentation and solidification processes of the melt in the coolant are characterized continuously and in real time in FIGS. 4(a)-(f). For the phase transition of the coolant, FIG. 5 shows the process of splitting gas sub-particles by the phase transition of the coolant particles due to heat exchange with the melt at a certain moment during the calculation. The gas particle cluster with multiple resolutions is generated during the phase transition, and the particle size of the particle cluster is 0.7-1.4 times of the initial spacing.

Thus, the method and the system for debris bed formation analysis based on a multi-resolution multiphase particle of the disclosure uses the least-squares moving particle method with second-order computational accuracy for discrete solution of the control equations, which improves the overall computational accuracy of the numerical simulation of the debris bed formation process. The dual-detection free-surface particle identification method used improves the identification accuracy of free-surface particles and realizes more refined phase interface tracking and localization. The multi-resolution gas-liquid phase transition model and the liquid-solid phase transition model used makes the debris bed formation analysis method and system equipped with the computational capability of simulating the gas-liquid phase transition of the coolant and solidification behavior of melts at the same time. The solid-solid collision module empowers the analysis method and system to compute collisions between the debris particles and debris beds. The method and system have the advantages of perfect functionality, high computational accuracy, good stability, and strong extensibility.

It can be understood that embodiments of the disclosure may be provided as methods, systems, or computer program products. Thus, the disclosure may take the form of an entirely hardware embodiment, an entirely software embodiment, or an embodiment combining software and hardware. Further, the disclosure may take the form of a computer program product implemented on one or more computer-usable storage media (including, but not limited to, disk memory, CD-ROM, optical memory, etc.) containing computer-usable program code therein.

The disclosure is described with reference to flowcharts and/or block diagrams of the method, device (system), and computer program product according to embodiments of the disclosure. It can be understood that each process and/or box in the flowchart and/or block diagram, and the combination of processes and/or boxes in the flowchart and/or block diagram, may be implemented by computer program instructions. The computer program instructions may be provided to a processor of a general-purpose computer, a specialized computer, an embedded processor, or other programmable data processing device to produce a machine such that instructions executed by the processor of the computer or other programmable data processing device produce a device for implementing a function in one or more processes of the flowchart and/or one or more boxes of the block diagram.

The computer program instructions may also be stored in a computer readable memory capable of directing the computer or other programmable data processing apparatus to operate in a particular manner, such that the instructions stored in the computer readable memory produce an article comprising an instruction device. The instruction device implements the function specified in one process or a plurality of processes in the flowchart and/or one box or a plurality of boxes in the block diagram.

The computer program instructions may also be loaded onto a computer or other programmable data processing device such that a series of operational steps are executed on the computer or other programmable device to produce computer-implemented processing, such that the instructions executed on the computer or other programmable device provide steps for implementing the functions specified in one process or a plurality of processes in the flowchart and/or one box or a plurality of boxes in the block diagram.

Described above are merely an illustration of the technical idea of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A method for analyzing debris bed formation based on a multi-resolution multiphase particle algorithm, comprising:
   (S1) based on an initial working condition of debris bed formation in a nuclear reactor, performing geometry modeling to obtain a geometric distribution of particles;
   (S2) performing a Link-list algorithm at each time step or several time steps to determine a position of each of the particles; and searching for neighboring particles within an effective radius of each particle's scope, and establishing link-list relationship for each particle;
   (S3) according to the link-list relationship established in step (S2) and a Courant-Friedrichs-Lewy (CFL) condition, determining a time step size for a current calculation;
   (S4) judging and identifying, based on an improved free-surface particle identification model, types of the particles in a computational domain, to identify an internal particle, a near-free surface particle, a free-surface particle, and an isolated particle in the computational domain;
   (S5) solving explicitly a gravity and a viscous force for the internal particle, the near-free surface particle, the free-surface particle, and the isolated particle identified in step (S4); solving explicitly a surface tension for the free-surface particle; and summing accelerations caused by the gravity, the viscous force, and the surface tension to calculate a temporary particle acceleration;
   (S6) according to the time step size determined in step (S3) and the temporary particle acceleration calculated in step (S5), calculating a temporary particle velocity and a temporary particle position;
   (S7) according to the temporary particle position calculated in step (S6), solving a discretized energy conservation equation to calculate a particle enthalpy; determining whether a particle undergoes a phase transition based on a change of the particle enthalpy; separating a gas particle from coolant particles undergoing a gas-liquid phase transition through a multi-resolution gas-liquid phase transition model; and correcting a phase state of molten particles that undergo a liquid-solid phase transition to become solidified through a liquid-solid phase transition model;
   (S8) retrieving solidified particles to identify debris particles and debris bed; based on a solid-solid collision model, calculating collision among the debris particles and deformation of the debris bed; and in combination with the temporary particle velocity and the temporary particle position determined in step (S6), correcting velocities and positions of the particles;
   (S9) based on the corrected velocities and the corrected positions obtained from step (S8), solving implicitly Pressure Poisson Equation (PPE) through a Biconjugate Gradient (BiCG) algorithm to update pressure of the particles; and (S10) calculating a pressure gradient term of all the particles using updated pressure obtained from step (S9); substituting the pressure gradient term into a momentum conservation equation to update the velocities and positions of all the particles; outputting a calculation result at a current time step to generate real-time data of formation process, size, shape, and porosity of the debris bed for analysis of a debris bed formation process; generating and displaying a visual dynamic cloud map of debris distribution over time based on the real-time data of the formation process, size, shape, and porosity of the debris bed; and monitoring and locating for a user, conditions of the debris bed formation inside the nuclear reactor based on the visual dynamic cloud map.

2. The method of claim 1, wherein in step (S4), a variable ifsur is introduced to characterize the types of the particles in the computational domain through a dual detection method based on geometric and algebraic calculations; the variable ifsur is defined as 0, 1, 2 or 3, respectively representing the internal particle, the near-free surface particle, the free-surface particle and the isolated particle;

among all quadrants of a particle i, if a proportion $\Psi(i)$ of quadrants in which the particle i has no neighboring particles is greater than 0.2, the particle i is the free-surface particle; otherwise, the particle i is the internal particle; and if the number of neighboring particles $N_{sum} < 6$ or a particle number density $n' < 0.6 n_0$, the particle i is the isolated particle, wherein $n_0$ represents an initial particle number density.

3. The method of claim 2, wherein after the internal particle, the free-surface particle and the isolated particle are identified, the internal particle is subjected to secondary identification to identify the near-free surface particle from the internal particle according to the following criterion:

for the particle i: if there exists a particle j satisfying ifsur$_j$=2 and ifsur$_i$=0, a correction of ifsur$_i$=1 is gotten; and for the particle i: if there exists a particle j satisfying ifsur$_j$=3 and ifsur$_i$=0, a correction of ifsur$_i$=1 is gotten; wherein ifsur$_i$ represents a type of the particle i; and ifsur$_j$ represents a type of the particle j.

4. The method of claim 1, wherein step (S5) is performed through steps of:

(S501) calculating color function values $col_{i,m}$ of all the particles using a weight function ww;

(S502) according to the color function values, classifying all the particles into a type I and a type II, and calculating surface curvatures of the type-I and the type-II particles; and (S503) according to the surface curvatures of the type I and the type II obtained in step (S502), calculating a surface tension of a type-II particle; and (S504) repeating step (S503) until a contribution of all components to the surface tension of the type-II particle is obtained, to obtain a resultant force $\vec{f}_i^{sf}$ of surface tensions of each of the particles, and calculate the temporary particle acceleration $\vec{a}'$.

5. The method of claim 4, wherein the temporary particle acceleration in step (5) is expressed as $\vec{a}'$:

$$\vec{a}' = g + \frac{1}{\rho}\nabla(\mu\nabla \cdot \vec{u}^n) + \frac{\vec{f}^{sf}}{\rho};$$

wherein $\vec{g}$ is gravitational acceleration; $\rho$ is density; $\mu$ is dynamic viscosity; $\vec{u}^n$ represents a velocity at a previous time step; and $\vec{f}^{sf}$ represents a resultant force of surface tensions.

6. The method of claim 1, wherein in step (S7), the discretized energy conservation equation is solved to calculate enthalpies of the particles; according to an enthalpy change of a coolant particle, a vaporized mass and volume of the coolant particle are determined; and if a volume $vol_i^{n+1}$ of a coolant particle at a next time step is greater than a critical volume 1.4 $vol_{ini}$, it is determined that the coolant particle undergoes a gas-liquid phase transition; the coolant particle as a parent particle is split into a first sub-particle and a second sub-particle; a gas-phase fraction $vf_{par1}^{gw}$ and an enthalpy $h_{par1}^{n+1}$ of the first sub-particle are calculated; a gas-phase fraction $vf_{par2}^{gw}$ and an enthalpy $h_{par2}^{n+1}$ of the second sub-particle are calculated; and a volume fraction $vf_{par}^{m}$ of individual components in each of the first sub-particle and the second sub-particle is updated; and physical parameters of the first sub-particle and the second sub-particle are updated by volume weighting or mass weighting.

7. The method of claim 6, wherein according to an enthalpy change of a molten particle, a solid-phase fraction $\alpha_i^{sol}$ and temperature $T_i$ of the molten particle i are calculated; when the solid-phase fraction $\alpha_i^{sol}$ is greater than 0.995, it indicates that the molten particle is completely solidified, and a phase state of the molten particle is corrected to solid phase; and the solid-phase fraction $\alpha_i^{sol}$ and the temperature $T_i$ are calculated as follows:

$$\begin{cases} \alpha_i^{sol} = 1 & h_i^{n+1} < h_{sol} \\ \alpha_i^{sol} = \dfrac{h_{liq} - h_i^{n+1}}{h_{sl}} & h_{sol} \le h_i^{n+1} \le h_{liq} \\ \alpha_i^{sol} = 0 & h_{liq} < h_i^{n+1} \end{cases}$$

$$\begin{cases} T_i = T_{mel} + \dfrac{h_i^{n+1} - h_{sol}}{\rho c} & h_i^{n+1} < h_{sol} \\ T_i = T_{mel} & h_{sol} \le h_i^{n+1} \le h_{liq} \\ T_i = T_{mel} + \dfrac{h_i^{n+1} - h_{liq}}{\rho c} & h_{liq} < h_i^{n+1} \end{cases};$$

wherein $h_{liq}$ represents an enthalpy at complete melting; $h_i^{n+1}$ represents an enthalpy of the particle i at the next time step; $h_{sl}$ represents latent heat of melting; $h_{sol}$ represents the enthalpy at the onset of melting; $T_{mel}$ is melting temperature; $\rho$ is density; and c is specific heat capacity.

8. The method of claim 1, wherein in step (S8), solid particles in the computational domain are searched through Passively Moving Solid (PMS) model to identify the debris particle and the debris bed in the computational domain; a mass, a velocity, and an angular velocity of each solid block are calculated; and a velocity and an angular velocity of a solid block after collision are calculated to correct the velocities and positions of all the particles, expressed as:

$$\begin{cases} m_{bi}\dfrac{d\vec{u}_{bi}}{dt} = \vec{F}_{bi} \\ I_{bi}\dfrac{d\vec{\omega}_{bi}}{dt} = \vec{T}_{bi} \end{cases}$$

wherein $m_{bi}$ is a mass of a solid block i; $\vec{u}_{bi}$ is a velocity of the solid block i; $I_{bi}$ is a rotational inertia of the solid block i; $\vec{\omega}_{bi}$ is an angular velocity of the solid block i; $\vec{F}_{bi}$ is a resultant force applied to the solid block i; and $\vec{T}_{bi}$ is a resultant moment applied to the solid block i.

9. The method of claim 1, wherein in step (S10), a velocity $\vec{u}^{n+1}$ and a position $\vec{r}^{n+1}$ of all the particles at a next time step are obtained by the pressure gradient term, expressed as:

$$\vec{u}^{n+1} = \vec{u}^{**} + \Delta t \cdot \left(-\frac{\nabla p}{\rho}\right)$$

$$\vec{r}^{n+1} = \vec{r}^n + \Delta t \cdot \frac{\vec{u}^n + \vec{u}^{n+1}}{2};$$

wherein $\vec{u}^{**}$ is the corrected velocity of a particle obtained in step (S8); $\Delta t$ is a time step size for the current calculation; $\nabla p$ is the pressure gradient term; $\rho$ is density; $\vec{u}^n$ is an initial velocity at a current time step; and $\vec{r}^n$ is an initial position at the current time step.

10. A computer system, comprising:
one or more processors;
memory; and
one or more programs, wherein the one or more programs are stored in the memory and configured to cause, when executed by the one or more processors, the system to:
(S1) based on an initial working condition of debris bed formation in a nuclear reactor, perform geometry modeling to obtain a geometric distribution of particles;
(S2) perform a Link-list algorithm at each time step or several time steps to determine a position of each of the particles; search for neighboring particles within an effective radius of each particle's scope; and establish link-list relationship for each particle;
(S3) according to the link-list relationship established in step (S2) and a Courant-Friedrichs-Lewy (CFL) condition, determine a time step size for a current calculation;
(S4) judge and identify, based on an improved free-surface particle identification model, types of the particles in a computational domain, to identify an internal particle, a near-free surface particle, a free-surface particle, and an isolated particle in the computational domain;
(S5) solve explicitly a gravity and a viscous force for the internal particle, the near-free surface particle, the free-surface particle, and the isolated particle identified in step (S4); solve explicitly a surface tension for the free-surface particle; and sum accelerations caused by the gravity, the viscous force, and the surface tension to calculate a temporary particle acceleration;
(S6) according to the time step size determined in step (S3) and the temporary particle acceleration calculated in step (S5), calculate a temporary particle velocity and a temporary particle position;
(S7) according to the temporary particle position calculated in step (S6), solve a discretized energy conservation equation to calculate a particle enthalpy; determine whether a particle undergoes a phase transition based on a change of the particle enthalpy; separate a gas particle from coolant particles undergoing a gas-liquid phase transition through a multi-resolution gas-liquid phase transition model; and correct a phase state of molten particles that undergo a liquid-solid phase transition to become solidified through a liquid-solid phase transition model;
(S8) retrieve solidified particles to identify debris particles and debris bed; based on a solid-solid collision model; calculate collision among the debris particles and deformation of the debris bed; and in combination with the temporary particle velocity and the temporary particle position determined in step (S6), correct velocities and positions of the particles;
(S9) based on the corrected velocities and the corrected positions obtained from step (S8), solve implicitly Pressure Poisson Equation (PPE) through a Biconjugate Gradient (BiCG) algorithm to update pressure of the particles; and
(S10) calculate a pressure gradient term of all the particles using updated pressure obtained from step (S9); substitute the pressure gradient term into a momentum conservation equation to update the velocities and positions of all the particles; output a calculation result at a current time step to generate real-time data of formation process, size, shape, and porosity of the debris bed for analysis of a debris bed formation process; generate a dynamic cloud map of debris distribution over time based on the real-time data of formation process, size, shape, and porosity of the debris bed; and monitor and locate for a user, conditions of the debris bed formation inside the nuclear reactor based on the visual dynamic cloud map.

* * * * *

UNITED STATES PATENT AND TRADEMARK OFFICE
CERTIFICATE OF CORRECTION

PATENT NO. : 12,079,300 B2  
APPLICATION NO. : 18/333165  
DATED : September 3, 2024  
INVENTOR(S) : Bin Zhang et al.

Page 1 of 1

It is certified that error appears in the above-identified patent and that said Letters Patent is hereby corrected as shown below:

On the Title Page

Item (72) Please correct the 1st-3rd, 5th-6th inventors' city name to "Xi'an".

Signed and Sealed this  
Twenty-second Day of October, 2024

Katherine Kelly Vidal  
*Director of the United States Patent and Trademark Office*